United States Patent [19]

Hu et al.

[11] Patent Number: 5,107,184

[45] Date of Patent: * Apr. 21, 1992

[54] REMOTE CONTROL OF FLUORESCENT LAMP BALLAST USING POWER FLOW INTERRUPTION CODING WITH MEANS TO MAINTAIN FILAMENT VOLTAGE SUBSTANTIALLY CONSTANT AS THE LAMP VOLTAGE DECREASES

[75] Inventors: Feng-Kang Hu; Chung M. Lau; Kevin Yang; Joshua S. Zhu, all of Torrance; Peter S. Shen, Rancho Palos Verdes, all of Calif.; Thomas C. Jednacz, Gastonia, N.C.

[73] Assignee: Electronic Ballast Technology, Inc., Torrance, Calif.

[*] Notice: The portion of the term of this patent subsequent to Oct. 8, 2008 has been disclaimed.

[21] Appl. No.: 565,688

[22] Filed: Aug. 13, 1990

[51] Int. Cl.$^5$ ............................................ H05B 41/36
[52] U.S. Cl. .......................... 315/291; 315/DIG. 4; 315/294; 315/106; 307/40
[58] Field of Search ........... 315/291, 294, 307, 209 R, 315/205, 297, 312, 361, 250, 101, 106, DIG. 4; 307/40; 340/310 R, 310 A, 825.03, 825.04; 364/492, 493

[56] References Cited

U.S. PATENT DOCUMENTS

| | | | |
|---|---|---|---|
| 4,215,276 | 7/1980 | Janeway | 307/40 |
| 4,370,600 | 1/1983 | Zansky | 315/291 X |
| 4,388,563 | 6/1983 | Hyltin | 315/205 |
| 4,866,350 | 9/1989 | Counts | 315/209 R |
| 5,055,746 | 10/1991 | Hu et al. | 315/291 |

Primary Examiner—Eugene R. LaRoche
Assistant Examiner—Ali Neyzari
Attorney, Agent, or Firm—Irving Keschner

[57] ABSTRACT

A dimming ballast system wherein the light output of the lamp is controlled by a remote source. The ballast output voltage is regulated by a voltage control feedback loop, the dimming function being achieved by varying the set point of the control loop. The remote control signal, coded by interrupting the current flow to the ballast for a short period, is processed digitally by a microcomputer which generates information to vary the control set point. Circuit means are provided to control the filament voltage of the fluorescent lamps such that as the lamps are dimmed down, the filament voltage is maintained or slightly increased, thus prolonging lamp life and stabilizing the lamp light output.

5 Claims, 6 Drawing Sheets

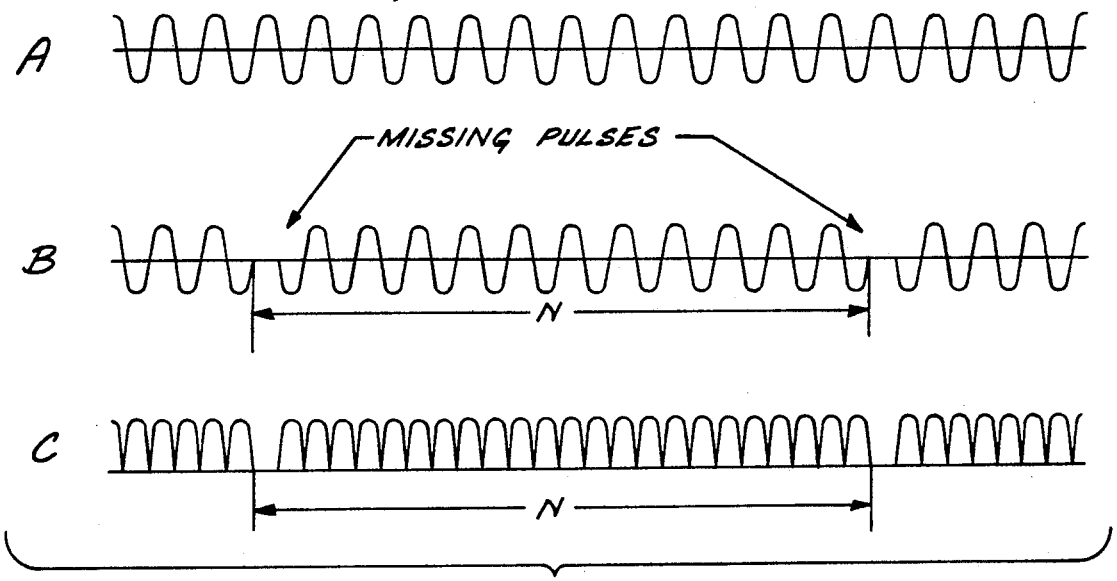
FIG. 2(a)
FIG. 2(b)
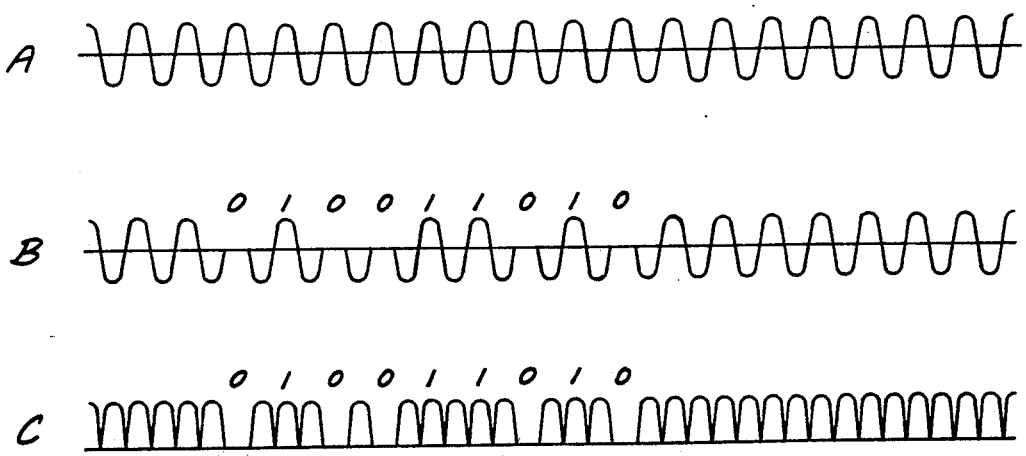

REMOTE CONTROL OF FLUORESCENT LAMP BALLAST USING POWER FLOW INTERRUPTION CODING WITH MEANS TO MAINTAIN FILAMENT VOLTAGE SUBSTANTIALLY CONSTANT AS THE LAMP VOLTAGE DECREASES

BACKGROUND OF THE INVENTION

1. Field of the Invention

The present invention relates to remotely controlled dimmable electronic ballasts for powering gas discharge lamps and, in particular, to a ballast system which utilizes a power line interruption coding system and means for controlling the lamp filament voltage such that as the lamps are dimmed, the filament voltage is increased.

2. Description of the Prior Art

The fluorescent lamp is designed to be a replacement for the incandescent lamp. The fluorescent lamp offers very large energy savings as compared to incandescent lamps. For example, a 28 watt fluorescent lamp offers the same light as a 100 watt incandescent lamp. This tremendous energy savings has been ignored in some applications because of the nonavailability of appropriate ballasts and control systems. For example, special lighting in restaurants, hallway lights, and other areas wherein the light level needs to be controlled for either energy savings or special effects has in the past used incandescent lamps with energy-wasteful dimming systems to obtain the desired effect. Incandescent dimming systems utilize either variable transformers, triacs or electronic means. The electronic means are the most cost-effective but have serious drawbacks in the form of a very low power factor, low efficiency an increased harmonic generation. The energy that may be saved by reducing the kilowatts delivered to the lamp load is utilized because of a low power factor and high harmonic generation. Since low power factor and high harmonics are harmful to the power system, power companies continue to search for ways to give their customers the lighting aesthetics they desire while still saving energy.

A dimming system would require adding extra wires in the wall to connect the controls and switches to the dimming ballasts. This is generally unacceptable, since it is very expensive and thus the prior art sought to communicate to the ballasts in a different manner. Prior art systems involved using carrier current type communications over the power line. A well-designed carrier current type system generally will work reliably in even difficult conditions. However, the greatest drawback with this type of communication system is that it is a broadcast system, i.e. signals are transmitted in all directions along the wires and therefore are required to carry complex coding information. In addition the ballasts themselves to have appropriate decoding or addressing circuitry. The overall modification is costly and requires a much larger wall switch box to accommodate the additional equipment. In addition to the communication problem noted, the prior art has sought to provide cost efficient techniques for controlling dimming of the fluorescent lamps. One of the approaches uses a frequency change method (shift) to both control the lamp current (power) and to maintain the lamp filament voltage substantially constant as the lamps were dimmed in order to maintain lamp life. Frequency dimming circuitry, however, adds to the overall cost and complexity of the dimming ballast system. A less costly prior art technique utilizes a variable voltage power source to control lamp dimming. However, filament voltage could not be controlled by a simple circuit to preserve lamp life, thus making the technique commercially unfeasible.

Typical of the prior art ballast control systems are those disclosed in U.S. Pat. No. 4,717,863 to Zeiler wherein a frequency modulated circuit is utilized to provide a variable voltage to dim the fluorescent lamp, an optical feedback system being utilized to regulate the frequency of the output signal; U.S. Pat. No. 4,523,128 to Stamm et al. which discloses a system for the remote control of a solid state ballast which interfaces with a power line carrier system to provide external addressing control signals, the control system including a signal receiver for receiving and recognizing remotely transmitted control signals addressed to the ballast; U.S. Pat. No. 4,889,999 to Rowen which discloses a control system wherein information is transmitted to individual dimmer controls by extra wires, the dimmer controls using a triac to control the voltage to the ballast to dim the light output; U.S. Pat. No. 4,388,567 to Yamazaki et al. which discloses a system for remotely controlling a dimming apparatus which uses single phase control to vary the voltage and therefore control light output; U.S. Pat. No. 4,388,563 to Hyltin which discloses a solid state fluorescent lamp ballast circuit in which line voltage is chopped to provide a high frequency input to a fluorescent lamp, the duty cycle of the chopping switches being modulated to permit dimming of a remotely located lamp; and U.S. Pat. No. 4,866,350 to Counts which discloses a system wherein power is provided to a fluorescent lamp through a single integrated circuit chip, control logic within the chip operating power switches therein at a frequency which is optimum for the fluorescent lamp.

Although the aforementioned prior art systems provide various features which improve upon the ballast used in fluorescent lighting systems, they all suffer in one way or the other from the disadvantages noted hereinabove, i.e. requiring a carrier current type encoding system and/or lamp dimming techniques which are costly, complex and not commercially viable.

SUMMARY OF THE PRESENT INVENTION

The present invention provides a dimming ballast system within a building structure wherein the lamp dimming is controlled from a remote source, the coded control signal being generated by interrupting the normal building power line in a predetermined sequence. In addition, the lamp filament voltage is increased or maintained as the d.c. bus voltage of the ballast is decreased as the lamp is dimmed. The ballast system comprises an electronic power factor correction portion which includes a power factor correction integrated circuit (IC), an inductor choke, a MOSFET transistor and a conversion portion. The MOSFET is switched on and off by a signal generated by the integrated circuit, which causes energy transfer from the inductor choke to the ballast DC bus to provide a DC voltage which is higher than the peak of the input line voltage to the conversion portion. The switching cycles of the MOSFET are controlled by the integrated circuit. The integrated circuit senses the input voltage waveform and forces the input current to closely follow the input voltage. As a result, the input current and the input voltage will almost be in phase and the power factor will be close to 1.

Thus, the harmonic components of the input current will be extremely small. The output DC voltage is regulated by means of a voltage control feedback loop which is determined by resistance value connected to the integrated circuit. By varying the resistance value, the output voltage will be changed accordingly, which in turn provides the dimming function. In a preferred embodiment, a microprocessor processes the remote control signal, the digital information of the control signal being decoded and the proper resistance value then being selected.

The output section portion of the ballast system comprises a self-resonating half-bridge invertor. To control the filament voltage, a ferrite core is used. The filament voltage is determined by the number of turns wound on the core and the frequency of the resonating circuit. As the output voltage is reduced, the frequency of the resonating circuit will increase as lamp impedance increases, thus increasing the filament voltage of the lamp accordingly. This later feature stabilizes the lamp light output when dimmed and prolongs the life of the lamp.

By interrupting the power line to provide the signal coding necessary for remote control of lamp dimming, the use of high frequency modulated signals, typically used in the prior art, is eliminated. This in turn eliminates the "broadcast" characteristics found in the prior art systems, thus reducing system cost and complexity since additional wires and addressing circuitry are not required. The concept of encoding the power signal emanating from one part of a building structure to control a dimming ballast located in another part of the building without adding additional wires as described hereinabove can be utilized to control devices other than dimming ballasts, such as gas discharge lamp sources, air conditioners, and dampers.

DESCRIPTION OF THE DRAWING

For a better understanding of the invention as well as other objects and further features thereof, reference is made to the following description which is to be read in conjunction with the accompanying drawing wherein:

FIGS. 2($a$)A-2($a$)C and 2($b$)A-2($b$)C are waveforms to illustrate the missing pulse coding system of the present invention;

DESCRIPTION OF THE INVENTION

Figure 1:
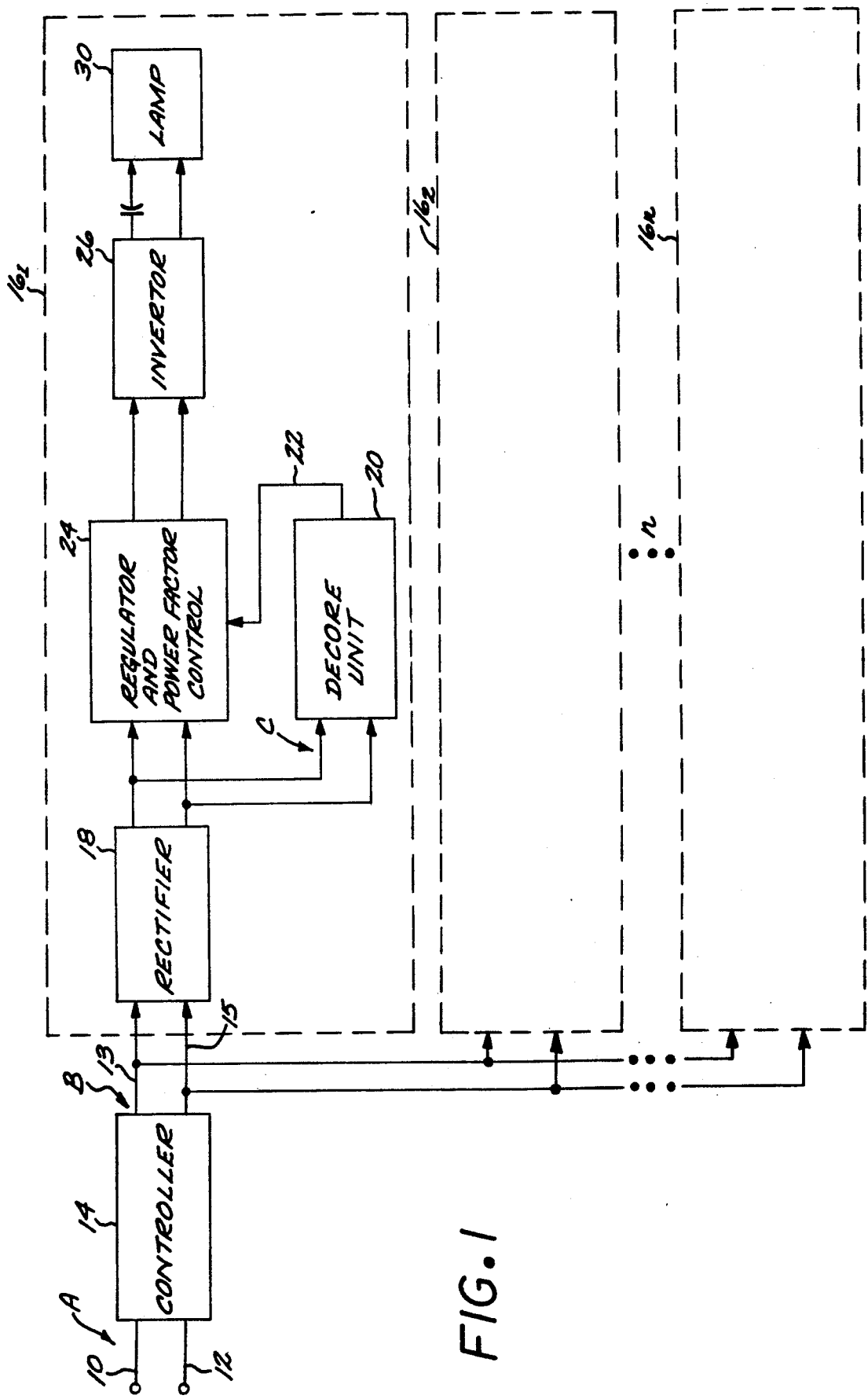
FIG. 1 is a block diagram of the system of the present invention.

Referring now to FIG. 1, a simplified block diagram of the dimming ballast control system of the present invention is illustrated.

In particular, standard electrical power (standard line source, typically 120 volts AC, 60 hertz) is supplied over power lines 10 and 12 located in a building structure to a controller 14 (waveform A, FIG. 2A) located in a wall switch unit. Controller 14, as set forth in more detail hereinafter, removes (or reduces the amplitude of) one pulse from the incoming alternating waveform in a predetermined time period N (waveform B, FIG. 2A). The time between missing pulses corresponds to a desired lamp dimming (power) level. The output signal from controller 14 is applied to a plurality of remote ballast units $16_1, 16_2 \ldots 16_n$. Each ballast unit is identical and thus only unit $16_1$ will be described in detail. The ballast unit $16_1$ comprises a rectifier 18 which provides a rectified DC voltage at its output (waveform C shown in FIG. 2A), a decoder unit 20 coupled to the output of rectifier 18, decoder 20 providing a reference control signal on lead 22 to IC regulator and power factor control unit 24 as will be described in more detail hereinafter. Regulator unit 24, coupled to the output of rectifier 18, provides a regulated DC voltage output which is adjustable. The output signal from regulator unit 24 is coupled to invertor 26 which provides a high frequency AC signal, the frequency of the signal being dependent on the magnitude of the DC signal at the invertor input. The high frequency AC signal is coupled to ballast capacitor 28 and then to the fluorescent lamp being controlled. The dimming ballast systems are located remotely from the wall switch and typically adjacent the fluorescent lamps.

An alternate encoding arrangement is represented by the corresponding waveforms shown in FIG. 2B wherein a sequence of missing pulses corresponds to a particular dimming level desired. The following description assumes that the encoding system shown in FIG. 2A is being utilized.

As will be explained in detail hereinafter, the output signal from the decoders determine the magnitude of the DC applied to invertor 26 and thus the AC voltage (current) applied to lamp 30. Invertor 26, in addition, controls the lamp filaments in a manner such that the filament voltage increases proportionately to the decrease (dimming) in voltage applied across the lamps.

In the system illustrated, the same dimming voltage is applied to each lamp responding to controller 14. Typically, a single wall switch in a room, for example, controls all the lamps in that room in a identical fashion.

Figure 3:
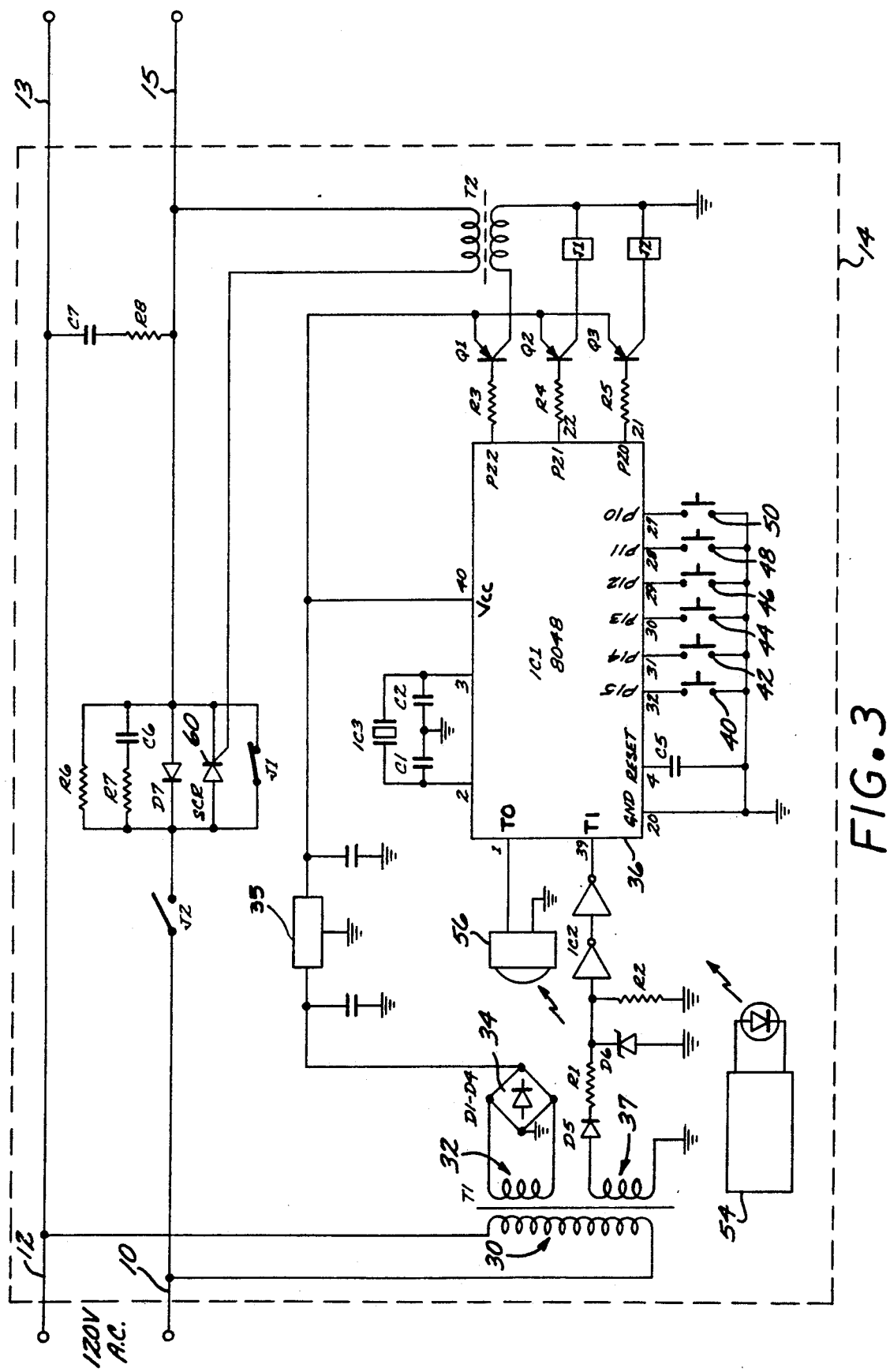
FIG. 3 is a schematic diagram of the transmitter portion of the ballast system of the present invention.

FIG. 3 is a schematic diagram of controller 14. The voltage on lines 10 and 12 is applied to the primary winding 30 of transformer T1. An auxiliary winding 32 of transformer T1 is connected to a full wave rectifier 34, the output thereof being coupled to pin VCC of microcomputer 36 via power signal conditioner circuit 35. Auxiliary winding 37 power applies the AC line signal appearing at primary winding 30 to pin T1 of microprocessor 36 in the form of periodic input pulses. Preferably, microcomputer 36 is the Model 8048 manufactured by Intel Corporation, Santa Clara, Calif. Input pins $P_{10}, P_{11} \ldots P_{15}$, are connected to ground via keys, or pushbuttons, 50, 48 ... 40, respectively, as illustrated. Keys 40, 42 ... 48, shown in the open, or inoperative, position turn on the fluorescent lamps when pressed to close the contacts and correspond to five different lamp power settings. The keys are located in the wall switch box. Key 50 corresponds to the off key and when closed causes microcomputer 36 to open J2 and turn off the lamps. As an optional device, a remote infrared controller 54 is used to control an infrared receiver 56, the coded output thereof being connected to pin To of microprocessor 36. As will be described with reference to the flowchart shown in FIG. 4, activation of one of the pushbuttons 40, 42 ... 48 generates a signal at pin $P_{22}$ which controls the magnitude of the voltage at the output of transistor Q1, and through transformer T2, the conducting state of thyristor, or silicon controlled rectifier, 60. Thyristor 60 determines the time period N between missing pulses of the coded signal (waveform C, FIG. 2A) being transmitted to decoder unit 20.

Figure 4:
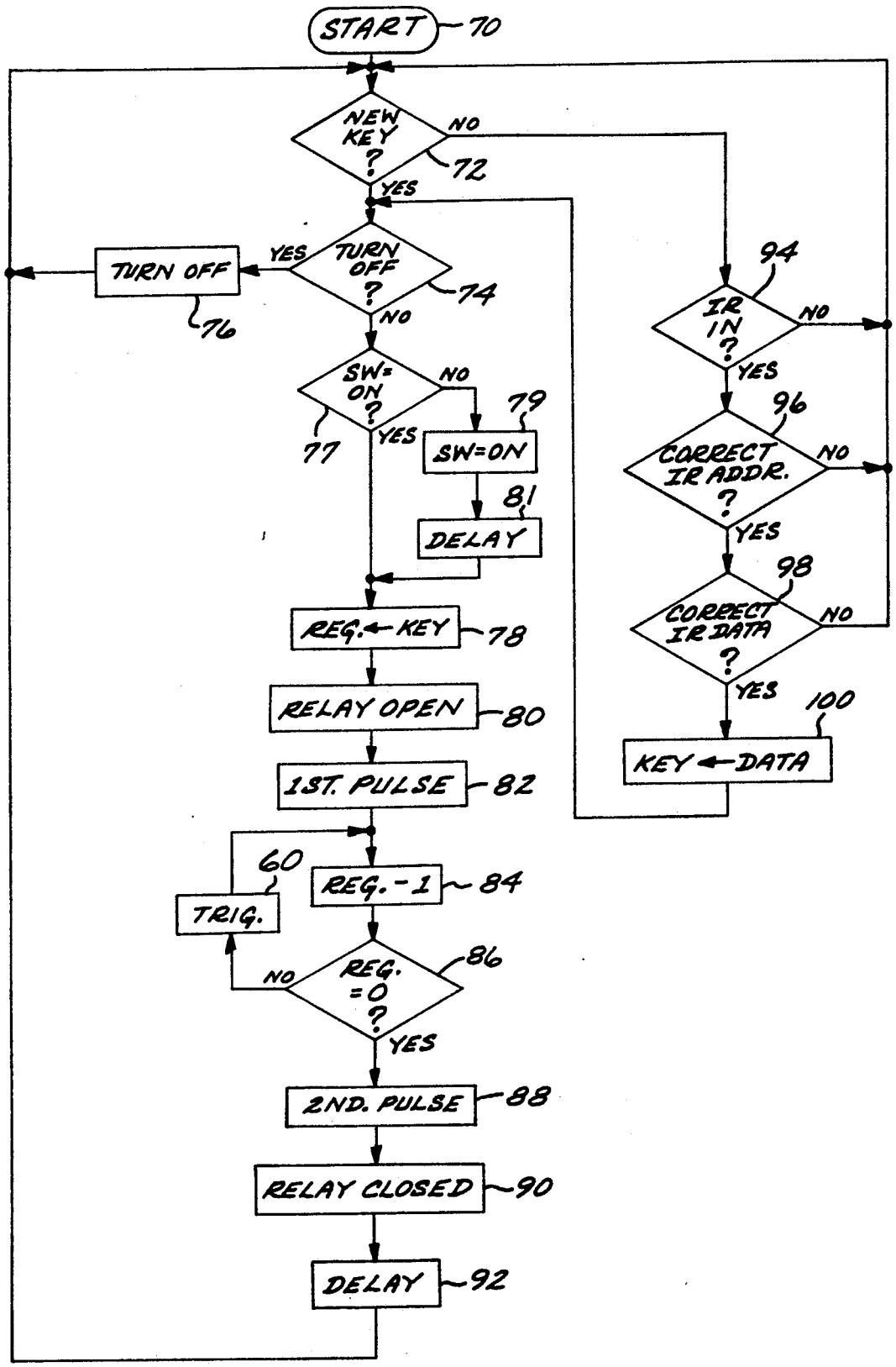
FIG. 4 is a flow chart illustrating the operation of the encoding microprocessor.

FIG. 4 illustrates the transmitter encoding flow chart. The flow chart is set forth to enable a computer programmer to program the Intel microcomputer described hereinabove in a manner such that the appropriate dimming coded signal is produced in response to a selected key. In particular when the microcomputer 36 is activated (symbol 70), the microcomputer initially determines whether any one of the keys 40, 42 . . . 48 have been engaged (symbol 72). If one of the coding keys has been depressed, the microcomputer next determines whether the turn-off key has been activated (symbol 74). If yes, the system is turned off (symbol 76) and the microcomputer returned to the start position. If no turn-off signal is present, the microcomputer 36 checks to see if relay J2 is activated (transistor Q3 is turned on) (symbol 77). If not, Q3 is turned on and a delay (symbol 81) is imposed to enable the lamps to start at the highest level (intensity) before returning to its preset level. If the microcomputer determines that relay J2 is engaged (Q3 on), the microprocessor 36 next searches a particular address in a look-up table for the depressed key (symbol 78). It should be noted that relay J1 is used to minimize energy losses during the time periods when the remote control function is not being utilized. When the system is used, the J1 relay contact is in the open position. After the relay contact is in the open position (symbol 80), thyristor 60 is used to prevent the first pulse (waveform FIG. 2A) in the AC signal to be transmitted to the ballast (symbol 82). As noted above, a register in microprocessor 36 has been set to a value corresponding to the particular key which has been depressed (in fact, the value in the register corresponds to the time period N). The register (symbol 84) is decremented each time a rectified pulse is detected at pin $T_1$ of microcomputer 36. If the register is not zero (symbol 86), the output at pin $P_{22}$ is such that transistor $Q_1$ causes thyristor 60 to allow the power to be transmitted to the ballast via lines 13 and 15. When the register is zero, the output at pin $P_{22}$ causes transistor $Q_1$ to bias thyristor 60 in a manner to prevent the second pulse to be transmitted during the period N (symbol 88). The relay is then deenergized (symbol 90), closing the relay contact. After a predetermined delay (symbol 92) to allow for mechanical "debouncing" of the keys, the cycle repeats itself (microprocessor 36 scans pins $P_{10}$, $P_{11}$ . . . $P_{15}$ continuously to ascertain whether the setting for the lamp intensity has changed).

As noted previously, the ballast system of the present invention is arranged to have a remote infrared control option whereby a user can adjust the lamp dimming without depressing a key on the wall switch box. In this case, if the microprocessor 36 determines a key has not been depressed (symbol 72), a determination is made if a signal is at pin To (symbol 94). If not, the cycle is restarted. If there is a signal present, a check is made to see if the signal (most remote infrared signaling devices have a preset address data) has a correct address (symbol 96). If not the cycle is restarted. If the address is correct, a check is made to see if the preset signal data (a portion of the entire data) is correct (symbol 98). If not, the cycle restarts. If the data is correct, the remaining portion of the data, coded to correspond to one of the keys 40, 42 . . . 48 when depressed, causes the cycle (symbol 100) to start at the input point to symbol 74 as illustrated.

Figure 5:
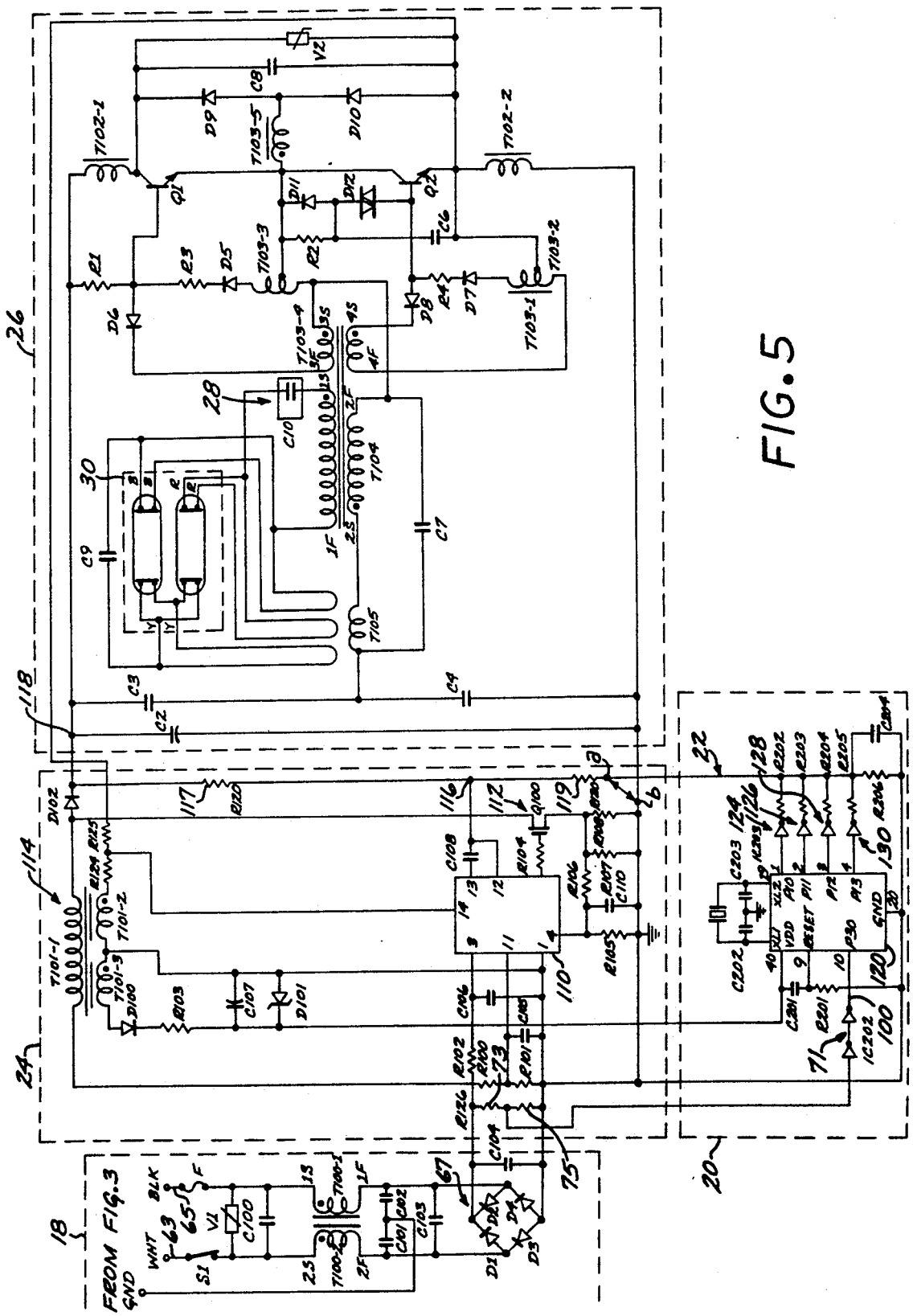
FIG. 5 is a schematic diagram of the dimming ballast portion of the ballast system of the present invention.

Referring now to FIG. 5, a schematic diagram of the ballast system $P_{23}$ is illustrated.

The coded signal (waveform B, FIG. 2A) on the power output lines 13 and 15 (FIG. 3) is coupled to the input power lines 63 and 65, respectively, as illustrated. The coded signal is applied to rectifier circuit 18 comprising diode full wave bridge circuit 67 and to AC boost convertor circuit 114. The signal output from bridge circuit 67 is coupled to Schmitt trigger circuit 71 via a voltage divider circuit comprising resistors 73 and 75, trigger circuit 71 converting the missing rectified AC pulse waveform to a corresponding shaped pulse waveform which is applied to input pin 30 of microprocessor 120. The output of the bridge circuit 67 is also applied to one input of integrated circuit 110. As explained hereinafter, the output of circuit 110, preferably a commercially available Siemens TDA 4814A chip, switches MOSFET 112 from a conducting to a non-conducting state and vice versa at a frequency rate dependent upon the magnitude of the input voltage, the DC bus voltage, the inductance value of the inductor choke (114) and the desired input current. This in turn causes energy to be transferred from inductor choke 114 to output junction 118 (and across capacitor C2). Integrated circuit 110 also senses the input voltage waveform at pin 11 and forces the input current to resemble the voltage. As a result, the input current and input voltage will be substantially in phase and the power factor (cosine of the phase angle between the waveforms) will be close to one, typically 0.995. Thus, the harmonic content of the input current will be greatly minimized. As noted above, microcomputer 120, preferably an Intel 8051, functions to decode the input coded signal and effectively generate a resistance value at node 116 (input to pin 12 of chip 110) corresponding to the appropriate key depressed in the wall switch unit (it should be noted that the ballast system of the present invention can also be utilized without remote control i.e. if a variable resistance is applied directly across the taps a and b illustrated). In particular, and as explained with reference to the flow chart shown in FIG. 6, microcomputer 120 continuously scans input pin $P_{30}$ and determines the length of time between missing pulses. According to this information, selected ones of the open drain inverters 124, 126 . . . 130 connected to pins $P_{10}$, $P_{11}$ . . . $P_{13}$, respectively, are biased into the non-conducting state, thus connecting the resistances associated therewith into a voltage dividing circuit with resistances R120. The value of the resistance applied to pin 12 determines the DC bus voltage at junction 118. Changing the DC bus voltage at junction 118 determines the energy transfer (pulse) rate of the signal from inductor (choke) 114 applied across capacitor C2. It should be noted that chip 110 and the boost converter circuit are connected in a manner such that a total DC voltage at junction point 118 is greater than the peak input voltage (170 volts) applied to lines 63 and 65.

The output section of the ballast is basically a self-resonating halfbridge invertor which converts the DC power to high frequency AC (20–50 KHZ), the circuit comprising capacitors C3, C4, C6, C7 and C10, transistors Q1 and Q2, transformer T103 and diodes D5, D6, D7, and resistors R1, R2, R3 and R4. In this invertor circuit, the output voltage waveform is close to sinusoidal. The frequency is mainly determined by capacitor C7, the inductance of the primary winding of transformer T103, capacitor C10 and load (lamp) impedance. To control the filament voltage applied to fluorescent lamps L1 and L2 (although only two lamps are illustrated, the concept of the present invention can be utilized with one or more than two fluorescent lamps), a transformer T104 which is a ferrite core is utilized. Increasing filament voltage during dimming is accomplished by saturable transformer T104 which is connected in series with the secondary winding of T103 and capacitor C7, a resonant tank with reasonably higher impedance than the input impedance of T104. The filament voltage is determined by the number of turns wound on the ferrite core and the frequency of the resonating circuit. Transformer 104 is designed to operate at deep saturation when maximum voltage appears across C2. As the output voltage across C2 is reduced, for example, by the control of microcomputer 120, the frequency of the resonating circuit will increase as the impedance of the fluorescent lamps increase. Thus, the filament voltage of the lamps will increase accordingly, both stabilizing the lamp light output when dimmed down and increasing lamp life.

The operating points of the fluorescent lamps in the preferred embodiment are set substantially as follows:

| Light Output (%) | Lamp Watts | Voltage (Volts) | Resonant Frequency (KHz) | Filament Voltage (Volts) |
| --- | --- | --- | --- | --- |
| 100% | 230 | 420 | 20.04 | 3.54 |
| 75% | 172 | 336 | 20.62 | 3.72 |
| 50% | 115 | 267 | 22.10 | 3.94 |
| 25% | 57.5 | 237.5 | 24.57 | 4.095 |
| 10% | 23 | 220 | 25.55 | 4.072 |

The details of the circuit operation are as follows. The voltage output from the secondary winding of T104 is applied across lamps L1 and L2. The inductor (choke) T102 limits current flow in the circuit, thus enabling a sinusoidal waveform to be generated. The voltage across windings T103 and T104 also have a sinusoidal waveshape, winding T104 being coupled to the lamp filament windings, the secondary winding of T103 being coupled across the lamp to initiate the arc. Windings T103 and T104 and capacitor C7 form the circuit resonant tank. Winding T104 is designed to make the core saturate, the secondary voltage from T104 being substantially constant because its flux density is set to the maximum. The nominal (highest level) DC bus voltage at junction point 118, for 100% light output, is set at 420 volts. When the DC voltage at junction point 118 is reduced, the voltage of the secondary winding of T103 is also reduced proportionately. Thus the current through C10 and the lamps L1 and L2 is also reduced. Since each lamp has a negative resistance, as current is reduced, the voltage increases and the lamp impedance increases. The effective capacitance of C10 reflected to the primary of T103 is reduced, the overall circuit reactance thus being lower and increasing the circuit resonant frequency. Since the core of T104 is in deep saturation, the voltage reduction does not change its status, the flux density remaining substantially constant. In this case, the voltage applied to the lamp filaments is essentially proportional to the resonant frequency. The above operation repeats itself as the dimming voltage decreases.

Figure 6:
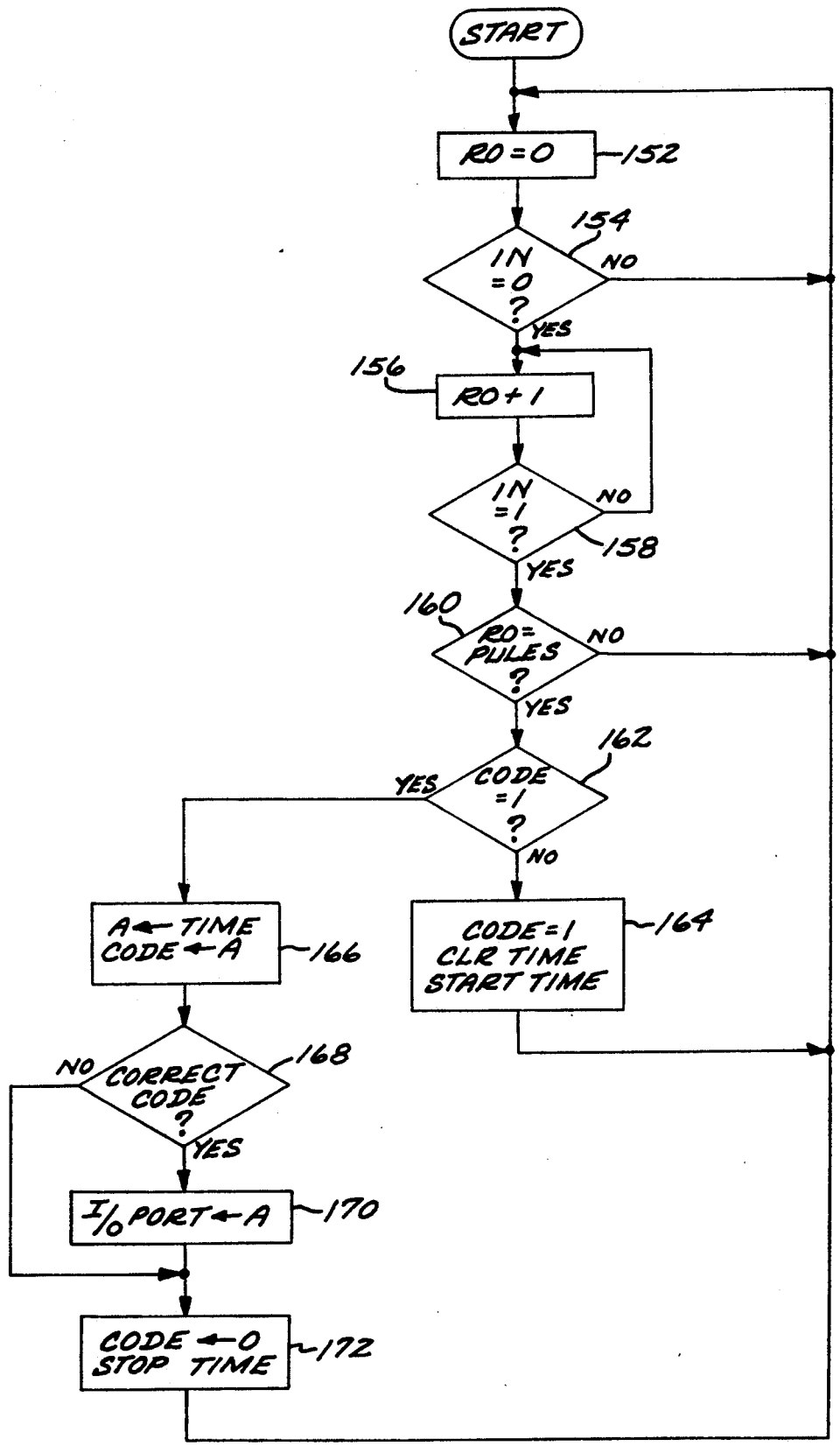
FIG. 6 is a flow chart for the microprocessor utilized to decode the information transmitted from the wall switch box.

Resistances R100 and R101 sample the sinusoidal input voltage waveform to the circuit, or chip, 110 to control the power correction factor. It is, as noted hereinabove, preferred to have the input current close to the input voltage (phase, shape). The input current is sensed as it flows through resistors R107 and R108. Resistors R105 and R106 are used to compensate for the voltage of the fluorescent lamps being used. Capacitor C108, resistor R120 and the effective variable resistance at node point 116 functions both to filter out 120 Hz ripple and as a voltage control loop, i.e. to stabilize and regulate the DC voltage at node point 118. FIG. 6 illustrates the receiver decoding flow chart. The flow chart is set forth to enable a computer programmer to program the Intel No. 8051 microcomputer described hereinabove in a manner such that the D.C. voltage corresponding to the desired lamp output dimming is provided to the circuitry controlling lamp operation.

At the start of the operation of microcomputer 120 (FIG. 5), register $R_0$ is set to zero (symbol 152) and the input to microcomputer 120 from the Schmitt triggers is tested (checked) continuously (symbol 154). The input testing is done on a continual basis. If the initial input test indicates that an input pulse is not present, the $R_0$ register is incremented one unit (symbol 156). If the input test indicates a pulse is present, the process restarts. The input is tested again (symbol 158) and if no input pulse is present, the $R_0$ register is incremented one unit. If the input test indicates that a pulse is present, the count in the $R_0$ register is compared with the value in the PULSE register (symbol 160). The PULSE register has a value corresponding to the time period of a missing pulse. If the value in the $R_0$ register corresponds to the value in the PULSE register (corresponding to the first pulse after a period during which no pulse appeared) a third register (CODE) is tested to ascertain if it is set to 1 (symbol 162). If not, the CODE register is set to 1, the timer is first cleared and then started (symbol 164). If the CODE register previously has been set to 1, the value in the timer is transferred to an accumulator, the value in the accumulator corresponding to an address in a look-up table (symbol 166). The value in the look-up table corresponds to the key depressed in the wall switch box. If the value in the timer is not the preset value (symbol 168), the timer value will not be decoded, the CODE register is cleared and the timer is stopped (symbol 172) and the process restarted. If the value in the timer is correct, a control code corresponding to the key depressed in the wall switch box can be obtained from the look-up table. The control code is sent to pins $P_{10}$ through $P_{15}$ to control the corresponding pin (symbol 170). In this case, the CODE register is cleared, the timer stopped and the process restarted.

The present invention thus provides an improved dimmable fluorescent lamp ballast system which encodes the power line signal in a building structure in accordance with a desired dimming state such that additional wires are not required in the structure, thereby reducing the cost of system installation. In addition, the lamp filament voltage is maintained substantially constant or increased slightly as the dimming voltage is decreased, thus both stabilizing lamp light output and prolonging lamp life.

The concept of providing a building structure control system for controlling the operating status of a remote device, as set forth in the present invention, without adding additional wires to the structure, can be utilized to control devices other than fluorescent lamp ballasts, such as other gas discharge lamp systems, air conditioners, and dampers.

While the invention has been described with reference to its preferred embodiment, it will be understood by those skilled in the art that various changes may be made and equivalents may be substituted for elements thereof without departing from the true spirit and scope of the invention. In addition, many modifications may be made to adapt a particular situation or material to the teaching of the invention without departing from its essential teachings.

What is claimed is:

1. A system for controlling a plurality of devices located in a structure having existing power lines such that each device operates at either a first or second condition comprising:

a source of AC power located in said structure;

encoder means remote from said devices responsive to said power source for generating a cyclical signal having a plurality of adjacent pulses in each cycle, at least one pulse in each cycle being missing;

decoder means; and means for transmitting said pulse signal to said decoder means over said power lines, said decoder means decoding each cyclical pulse signal and generating a DC voltage having a first or second magnitude, a DC voltage of said first magnitude causing each of said devices to operate at said first condition, a DC voltage of said second magnitude causing each of said devices to operate at said second magnitude.

2. The system of claim 1 wherein the magnitude of said DC voltage is set by the time period between missing pulses in succeeding cycles in said cyclical AC signal.

3. The system as defined in claim 2 wherein said encoding means comprises a microcomputer.

4. The system as defined in claim 3 wherein said decoder means comprises a microcomputer.

5. The system of claim 4 wherein said device comprises a fluorescent lamp.

* * * * *